E. B. LAKE.
SPRING-CURTAIN ROLLERS.

No. 185,549.              Patented Dec. 19, 1876.

Witnesses
Saml J. Van Stavoren
Jos. P. Connolly

Inventor
Ezra B. Lake,
Connolly Bros, Attorneys

UNITED STATES PATENT OFFICE.

EZRA B. LAKE, OF BRICKSBURG, NEW JERSEY, ASSIGNOR TO SALEM SHADE ROLLER MANUFACTURING COMPANY, OF SALEM, MASSACHUSETTS.

IMPROVEMENT IN SPRING CURTAIN-ROLLERS.

Specification forming part of Letters Patent No. 185,549, dated December 19, 1876; application filed April 4, 1876.

*To all whom it may concern:*

Be it known that I, EZRA B. LAKE, of Bricksburg, in the county of Ocean and State of New Jersey, have invented certain new and useful Improvements in Spring Curtain-Rollers; and I do hereby declare the following to be a full, clear, and exact description of the invention, such as will enable others skilled in the art to which it pertains to make and use it, reference being had to the accompanying drawings, which form part of this specification, in which—

Figure 1:
Figure 2:
Figure 3:
Figure 4:
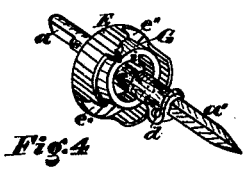
Figure 5:
Figure 6:
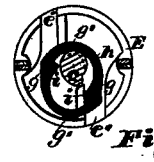
Figure 7:
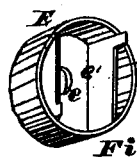
Figure 8:
Figure 9:
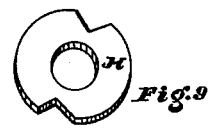
Figure 10:
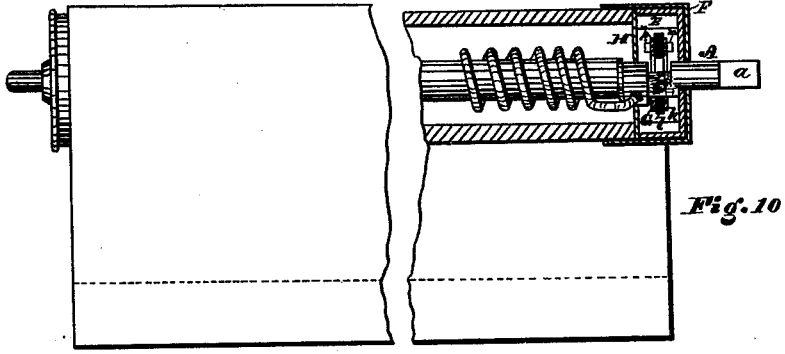
Figure 11:
Figure 12:
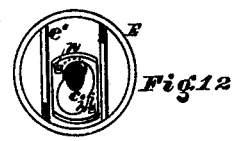

Figure 1 is a perspective of the head; Fig. 2, perspective of the slotted collar; Fig. 3, a perspective of the shaft. Fig. 4 is a perspective view of the collar-head and shaft combined. Figs. 5 and 6 are cross-sections of a roller-head in different positions. Fig. 7 is a perspective view of head of roller. Fig. 8 is a perspective view of the slotted collar. Fig. 9 is a perspective view of the inner end of roller-head. Fig. 10 is an elevation, partly sectional, of a curtain-roller with curtain attached. Figs. 11 and 12 are sectional views of the roller-head in different positions.

The object of my present improvements is to provide a noiseless spring-roller which will wind up the shade when the latter is held and drawn upon with sufficient force to prevent the rapid rotation of said roller, and which will be caused to lock by letting go of said shade. My improvements consist in the peculiar construction, combination, and arrangement of parts, having reference particularly to the following points: First, to the provision of a slotted collar encircling the fixed shaft of the roller and arranged to rotate with and slide vertically in a recessed or grooved head in said roller, the said shaft having a shoulder or cam on its under side which the collar will clear by means of its sliding movement in the head when the roller rotates slowly, but which will cause the said collar to be wedged between it and said head by the influence of the spring the moment the shade is let go. Second, to the provision of an india-rubber or other equivalent packing for preventing the rattling of the collar-head and shaft when the shade is being moved up or down.

Referring to the accompanying drawings, A represents the iron shaft, having a triangular end, $a$, which fits in a correspondingly-formed socket in the bracket (not shown) by means of which said shaft is held fixed and supported. The opposite end $a'$ of said shaft is to be inserted in or fastened to a wooden extension, which passes into the spring-socket in the roller. Between said ends the shaft is formed as follows: At $b$ it is made perfectly round, so as to permit the free rotation around it of a head attached to the roller; at $c$ is a cam or shoulder for arresting the rotation of said roller; and at $d$ is a perforated lug for receiving the outer end of the winding-spring. E represents a head fastened on the end of the roller by a cap, F, said head having a circular central opening, $e$, for the passage of the shaft A. Said head is also grooved or formed with vertical ways or guides $e^1$, between which fits a slotted collar, G, the object of said guides being to cause the said collar to rotate with the head and yet be free to slide vertically thereon when the roller is slowly turning. The collar G is formed with two straight sides, $g\ g$, and two curved ends, $g^1\ g^1$. The slot $g^2$ in said collar is of the peculiar shape shown in the drawing, its outline being formed of the two long curves, $h\ h$, meeting the short curves $h'\ h'$, producing shoulders $i\ i$, said shoulders, when the straight edges of the collars are vertical, being in or about in the same horizontal plane with the middle of said long curves. The effect of this construction is as follows: When the roller is caused to rotate slowly under the influence of the spring, by holding down the shade with only the requisite degree of tension for that purpose, the head E moves with said roller, the collar G turning with said head. As soon as the head gets in such position that the guides $e'$ are vertical, the collar G slides down between them, the slot $g^2$ then extending far enough below the cam or shoulder $c$ on the shaft A to clear it, thus permitting the free rotation of the roller. As soon, however, as the shade is "let go," the spring starts the roller on a quick motion, which is instantly arrested by the collar G wedging between the cam or shoulder $c$ and one of the guides $e'$, said collar not having time enough to slide down between its guides so as to clear said cam. The wedging of the collar prevents the movement of the head E, checks the rotation of the roller and prevents the upward motion of the shade. To prevent the rattling of the collar, as also to avoid the jar upon the parts incident to suddenly stopping the rotation of the roller, which usually causes the shade to "jump," the collar may be made of two thin metallic disks, $k\ k$, between which is a similarly-shaped disk, $l$, of india-rubber or other equivalent material, the edges of said rubber disk $l$ projecting a trifle beyond those of the disks $k\ k$. The several disks will be held together by pins $m\ m$, on which are rubber washers $n\ n$, to prevent contact between the body of the collar G and the head E. H is a thin metallic disk, interposed between the end of the roller and the flange $e^3$ of the head E, said disk being designed to prevent the lateral displacement of the collar G within said head.

What I claim as my invention is—

1. The head E, formed with the guides $e^1$, for causing the rotation and permitting the sliding of the collar G, in combination with said collar, having a shouldered slot, and the shouldered shaft A, substantially as shown and described.

2. The collar G, having the straight sides $g$ $g$ and curved slot $g^2$, substantially as shown and described.

3. The shaft A, formed with the cam or shoulder $c$, for preventing the rotation of the roller, in combination with the shouldered sliding collar G, substantially as shown and described.

4. The combination of the shaft A, having the cam or shoulder $c$, the head E, having guides $e^1$, and the collar G, having straight sides $g\ g$ and a curved slot, $g^2$, the several parts being constructed and arranged for conjoint operation, substantially as shown and described.

5. The collar formed of the metallic disks $k\ k$ and interposed rubber disk $l$, to prevent rattling and avoid the jumping of the shade when the spring is checked, substantially as shown and described.

6. In combination with the disks $k\ k\ l$ the rubber washers $n\ n$ on the pins $m\ m$, by which said disks are held together, substantially as shown and described.

In testimony that I claim the foregoing I have hereunto set my hand this 21st day of March, 1876.

EZRA B. LAKE.

Witnesses:
M. DANL. CONNOLLY,
CHAS. F. VAN HORN.